US012339603B2

(12) United States Patent
Arai

(10) Patent No.: US 12,339,603 B2
(45) Date of Patent: Jun. 24, 2025

(54) IMAGE FORMING APPARATUS

(71) Applicant: Yuki Arai, Kanagawa (JP)

(72) Inventor: Yuki Arai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 59 days.

(21) Appl. No.: 18/512,079

(22) Filed: Nov. 17, 2023

(65) Prior Publication Data

US 2024/0168413 A1 May 23, 2024

(30) Foreign Application Priority Data

Nov. 22, 2022 (JP) ................................ 2022-186376

(51) Int. Cl.
*G03G 15/16* (2006.01)
*G03G 15/01* (2006.01)
(Continued)

(52) U.S. Cl.
CPC ..... *G03G 15/1615* (2013.01); *G03G 15/0142* (2013.01); *G03G 15/0189* (2013.01); *G03G 15/0867* (2013.01); *G03G 15/0872* (2013.01); *G03G 15/0896* (2013.01); *G03G 21/16* (2013.01); *G03G 21/1604* (2013.01); *G03G 21/1619* (2013.01); *G03G 21/1623* (2013.01);
(Continued)

(58) Field of Classification Search
CPC ........... G03G 15/0142; G03G 15/0189; G03G 15/0867; G03G 15/0872; G03G 15/0896; G03G 15/1615; G03G 21/16; G03G 21/1604; G03G 21/1619; G03G 21/1623; G03G 21/1633; G03G 21/1647; G03G 21/1661; G03G 21/1676; G03G 21/168; G03G 21/1821; G03G 21/1842; G03G 2215/1661; G03G 2215/1642
See application file for complete search history.

(56) References Cited

U.S. PATENT DOCUMENTS

| | | | | |
|---|---|---|---|---|
| 2007/0059033 A1* | 3/2007 | Kitozaki | G03G 21/1647 | 399/110 |
| 2011/0064458 A1* | 3/2011 | Kawai | G03G 21/16 | 399/121 |
| 2021/0063947 A1* | 3/2021 | Kataoka | G03G 21/1647 | |

FOREIGN PATENT DOCUMENTS

| | | |
|---|---|---|
| JP | H07-199678 A | 8/1995 |
| JP | 2000-187400 A | 7/2000 |

(Continued)

*Primary Examiner* — Joseph S Wong
(74) *Attorney, Agent, or Firm* — XSENSUS LLP

(57) ABSTRACT

An image forming apparatus includes an image forming device, a body, an intermediate transfer unit, a cover, and a guide rail. The body has a bottle housing hole in which a toner bottle is removably inserted. The intermediate transfer unit includes an intermediate transfer belt and a plurality of rollers to drive the intermediate transfer belt and is removably disposed between the image forming device and the bottle housing hole. The intermediate transfer unit and the toner bottle are accessible from a front side of the body. The openable and closable cover is disposed at an inlet-and-outlet port of the bottle housing hole. The guide rail is disposed at a lower side of the bottle housing hole to slidably guide the intermediate transfer unit and has a front-side end extended to a position crossing at least a vertical projection line of the cover on the front side of the body.

4 Claims, 9 Drawing Sheets

(51) Int. Cl.
*G03G 15/08* (2006.01)
*G03G 21/16* (2006.01)
*G03G 21/18* (2006.01)

(52) U.S. Cl.
CPC ..... *G03G 21/1647* (2013.01); *G03G 21/1661* (2013.01); *G03G 21/1676* (2013.01); *G03G 21/168* (2013.01); *G03G 21/1821* (2013.01); *G03G 21/1842* (2013.01); *G03G 2215/1661* (2013.01); *G03G 2221/1642* (2013.01)

(56) References Cited

FOREIGN PATENT DOCUMENTS

| | | | |
|---|---|---|---|
| JP | 2000-259003 | A | 9/2000 |
| JP | 2002-304104 | A | 10/2002 |
| JP | 2010-015161 | A | 1/2010 |
| JP | 2010-026371 | A | 2/2010 |
| JP | 2010-091866 | A | 4/2010 |
| JP | 2011-131434 | A | 7/2011 |
| JP | 2012-126004 | A | 7/2012 |
| JP | 2017-032760 | A | 2/2017 |
| JP | 2022-016900 | A | 1/2022 |

* cited by examiner

IMAGE FORMING APPARATUS

CROSS-REFERENCE TO RELATED APPLICATION

This patent application is based on and claims priority pursuant to 35 U.S.C. § 119(a) to Japanese Patent Application No. 2022-186376, filed on Nov. 22, 2022, in the Japan Patent Office, the entire disclosure of which is hereby incorporated by reference herein.

BACKGROUND

Technical Field

Embodiments of the present disclosure relate to an image forming apparatus, and in particular, to an image forming apparatus in which an intermediate transfer unit is easily attached to and detached from an apparatus body of the image forming apparatus.

Related Art

An electrophotographic image forming apparatus includes an image forming device having photoconductors, toner bottles for supplying developer to the photoconductors of the image forming device, and an intermediate transfer unit. The toner bottles are removably housed in bottle housing holes, and covers are disposed at inlet-and-outlet ports of the bottle housing holes. On the other hand, the intermediate transfer unit is detachably attached to an apparatus body of the image forming apparatus for, for example, maintenance. In order to smooth an attachment and detachment operation of the intermediate transfer unit, a horizontal guide rail for slidably guiding the intermediate transfer unit is disposed below the bottle housing hole. As for the direction of attachment and detachment of the intermediate transfer unit to and from the body of the image forming apparatus, in addition to a method of performing attachment and detachment from a lateral side of the body of the image forming apparatus, a method of performing attachment and detachment from a near side of the body of the image forming apparatus is known in the art. The latter method has the advantage that both the toner bottles and the intermediate transfer unit can be accessible from the front side of the body of the image forming apparatus.

SUMMARY

In an embodiment of the present disclosure, there is provided an image forming apparatus that includes an image forming device having a photoconductor, a body, an intermediate transfer unit, a cover, and a guide rail. The body has a bottle housing hole in which a toner bottle is removably inserted. The toner bottle is disposed above the image forming device to supply developer to the photoconductor. The intermediate transfer unit includes an intermediate transfer belt to contact the photoconductor and a plurality of rollers, on which the intermediate transfer belt is stretched, to drive the intermediate transfer belt to circulate. The intermediate transfer unit is removably disposed between the image forming device and the bottle housing hole. The intermediate transfer unit and the toner bottle are accessible from a front side of the body of the image forming apparatus. The cover that is openable and closable is disposed at an inlet-and-outlet port of the bottle housing hole. The guide rail is disposed at a lower side of the bottle housing hole to slidably guide attachment and detachment of the intermediate transfer unit and has a front-side end on the front side of the body. The front-side end is extended to a position crossing at least a vertical projection line of the cover.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
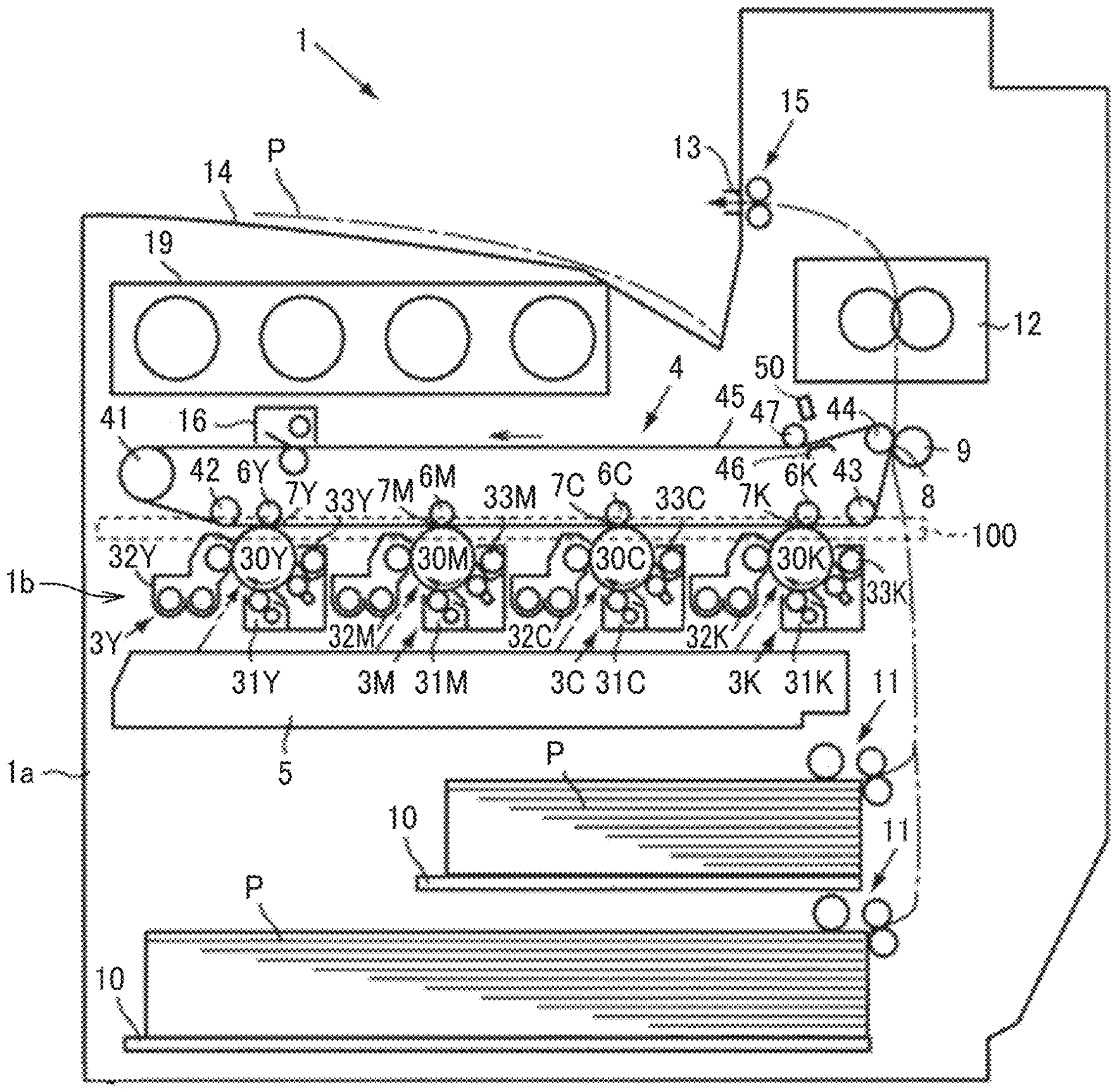
FIG. 1 is a schematic diagram of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

FIG. 1 is a four-tandem-type intermediate transfer color printer 1 that forms a color image from four-color toners of yellow, magenta, cyan, and black, illustrated as an image forming apparatus according to an embodiment of the present disclosure.

In FIG. 1, Y, M, C, and K are subscripts given to components related to colors of yellow, magenta, cyan, and black.

The color printer 1 is provided with bottle housing holes H in the upper portions of the front side of an apparatus body 1*a* as a housing, for individually housing four color toner bottles. In substantially the center of the apparatus body 1*a*, four process cartridge units 3Y, 3M, 3C, and 3K serving as image forming devices for forming respective single-color toner images from four color toner and the intermediate transfer unit 4 are disposed.

The process cartridge units 3Y, 3M, 3C, and 3K are disposed below the intermediate transfer unit 4. An optical unit 5 as an exposure device is disposed below the process cartridge units 3Y, 3M, 3C, and 3K.

The process cartridge units 3Y, 3M, 3C, and 3K include drum-shaped photoconductors 30Y. 30M, 30C, and 30K as image bearers on which electrostatic latent images are formed by exposure light emitted from the optical unit 5, respectively. The process cartridge units 3Y, 3M, 3C, and 3K, are provided with the photoconductors 30Y, 30M, 30C, and 30K, charging devices 31Y, 31M, 31C, and 31K, developing devices 32Y, 32M. 32C, and 32K, cleaning devices 33Y. 33M, 33C, and 33K, and discharging devices. The process cartridge units 3Y, 3M, 3C, and 3K perform an electrophotographic process with the above-described components to form monochrome toner images on the photoconductors 30Y, 30M, 30C, and 30K, respectively.

The intermediate transfer unit 4 is formed such that an endless transfer belt 45 as an intermediate transfer member is wound around rollers 41, 42, 43, and 44 as a plurality of rotation support members. The intermediate transfer unit 4 is formed such that rotation of the roller 41 causes the transfer belt 45 to rotate and convey in a counterclockwise direction in FIG. 1.

Primary transfer rollers 6Y, 6M, 6C, and 6K as primary transfer members are disposed at positions facing the photoconductors 30Y, 30M, 30C, and 30K in an inner loop of the transfer belt 45. The primary transfer rollers 6Y, 6M, 6C, and 6K press the transfer belt 45 toward the photoconductors 30Y, 30M, 30C, and 30K, respectively. Primary transfer sections 7Y, 7M, 7C, and 7K for transferring toner images on the photoconductors 30Y, 30M, 30C, and 30K to the transfer belt 45 are formed between the photoconductors 30Y, 30M, 30C, and 30K and the transfer belt 45. Transfer biases for primary transfer are supplied to the primary transfer sections 7Y, 7M, 7C, and 7K.

A secondary transfer section 8 is disposed downstream from the primary transfer sections 7Y, 7M, 7C, and 7K in a belt conveyance direction. The secondary transfer section 8 is disposed between a secondary transfer roller 9 as a secondary transfer member and the transfer belt 45. The secondary transfer roller 9 is disposed opposite the roller 44 and contacts the transfer belt 45. A transfer bias for secondary transfer is supplied to the secondary transfer section 8.

A plurality of trays 10 in which a recording material P is stored are disposed below the optical unit 5. The recording materials P stored in the tray 10 are separated one by one from the tray 10 by rollers 11 that perform feeding and separation of the recording materials P. The separated recording material P is conveyed toward the secondary transfer section 8.

In the secondary transfer section 8, the toner image transferred onto the transfer belt 45 at the primary transfer sections 7Y, 7M, 7C, and 7K is transferred onto the recording material P. The recording material P onto which the toner image is transferred is conveyed to a fixing device 12 disposed downstream from the secondary transfer section 8 in a recording-material conveyance direction. The fixing device 12 applies heat and pressure to the recording material P to fix the toner image on the recording material P, and conveys the recording material P toward an ejection port 13.

The recording materials P conveyed to the ejection port 13 are ejected and stacked by a roller pair 15 on an ejection tray 14 formed at an upper portion of the apparatus body 1*a*. After the transfer process of the toner image, for example, untransferred toner and paper dust are removed from the transfer belt 45 by a belt cleaner 16.

The process cartridge units 3Y, 3M, 3C, and 3K and the intermediate transfer unit 4 are supported by the apparatus body 1*a* in an attachable and detachable manner from the front side of the apparatus body 1*a*, and in a slidable manner to the apparatus body 1*a*. The process cartridge units 3Y, 3M, 3C, and 3K and the intermediate transfer unit 4 are disposed adjacent to each other in the apparatus body 1*a*.

In the present embodiment, slight gaps are formed at boundary portions 100 between upper portions 3Ya, 3Ma, 3Ca, and 3Ka of the process cartridge units 3Y, 3M, 3C, and 3K, and the intermediate transfer unit 4. With the above-described slight gaps, the process cartridge units 3Y, 3M, 3C, and 3K and the intermediate transfer unit 4 are disposed not to contact and interfere with each other when the process cartridge units 3Y, 3M, 3C, and 3K and the intermediate transfer unit 4 are attached to and detached from the apparatus body 1*a*.

Figure 2:
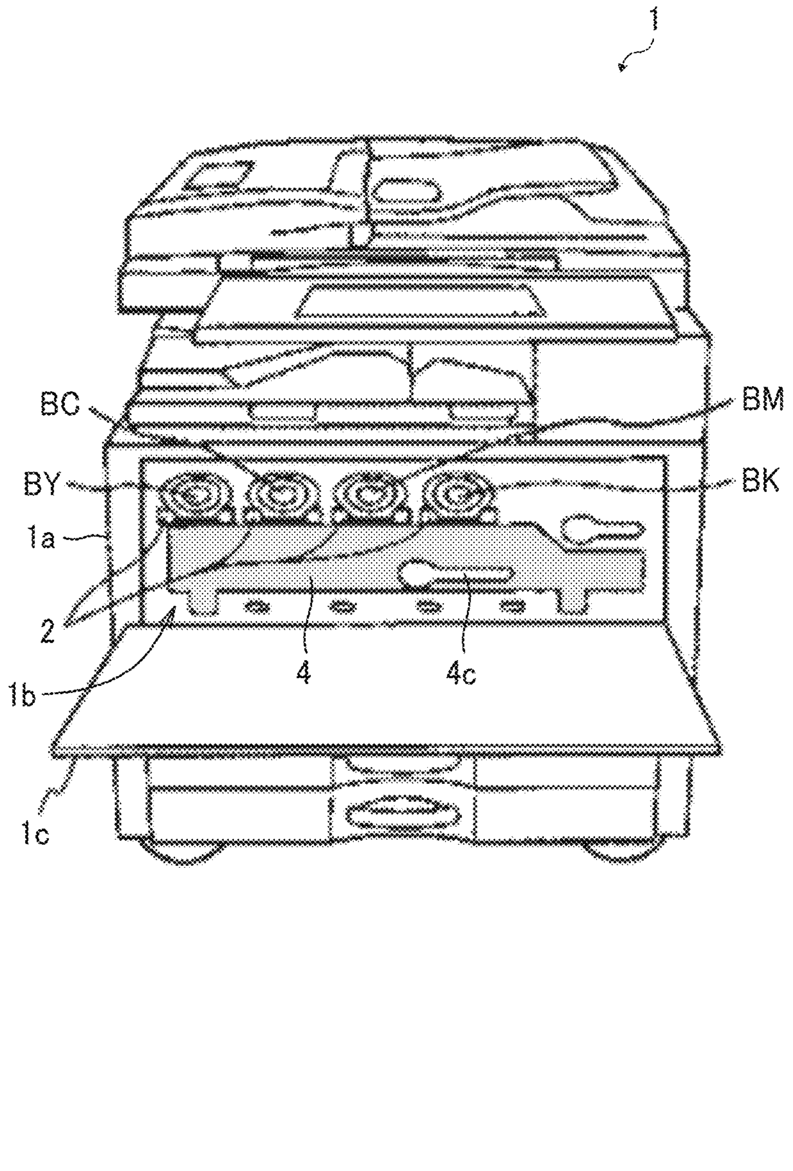
FIG. 2 is a perspective view of the image forming apparatus according to an embodiment of the present disclosure.

As illustrated in FIG. 2, a front cover 1*c* is disposed on the front side of the apparatus body 1*a*. The front cover 1*c* is openable and closable in a front-and-rear direction and an up-and-down direction around a hinge at a lower end. The front cover 1*c* covers the front sides of the bottle housing holes H of the toner bottles BY, BM, BC, and BK, the intermediate transfer unit 4, and the process cartridge units 3Y, 3M, 3C, and 3K as the image forming device 1*b*.

The inlet-and-outlet port of the bottle housing hole H is covered with a lockable cover 2. The cover 2 is openable and closable in a front-and-rear direction and an up-and-down direction around a support shaft 2A at a lower end.

A hook 2*a* is disposed at the upper end of the cover 2, and is engaged with a latch 7 of the apparatus body 1*a* to lock the cover 2. An opening-and-closing sensor detects whether the cover 2 is opened or closed.

Figure 3A:
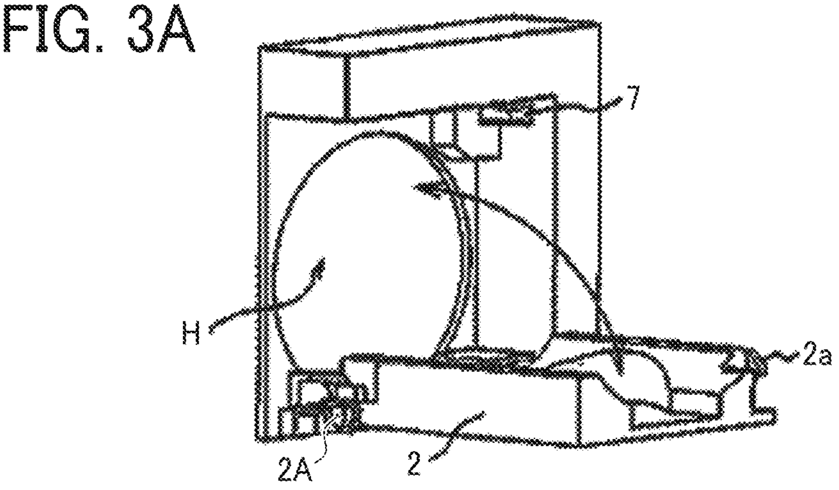
FIG. 3A is a perspective view of an inlet-and-outlet port of a bottle housing hole, according to an embodiment of the present disclosure.
Figure 3B:
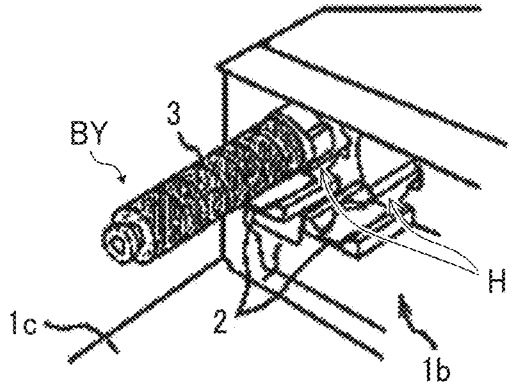
FIG. 3B is a perspective view of an inlet-and-outlet port when a toner bottle is removed, according to an embodiment of the present disclosure.
Figure 3C:
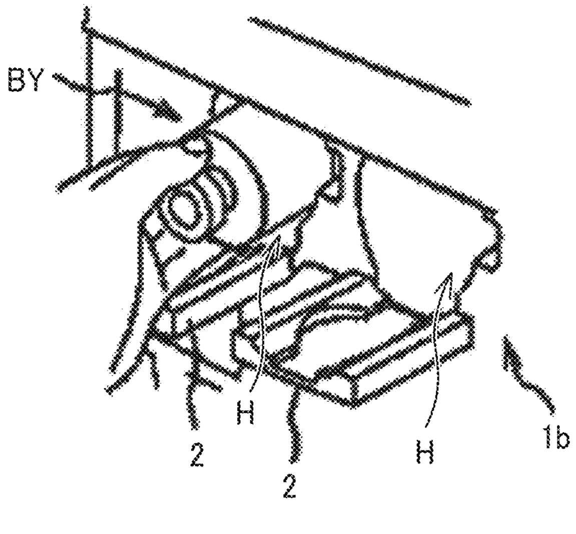
FIG. 3C is a perspective view of an inlet-and-outlet port when a toner bottle is inserted, according to an embodiment of the present disclosure.

When the replacement timing of the toner bottles BY, BM, BC, and BK is approaching, the latch 7 is unlocked to enable the cover 2 to be opened. In order to prompt a user to replace the toner bottles BY, BM, BC, and BK, an operation panel in an upper portion of the apparatus body of the image forming apparatus 1 displays, with the blinking of a lamp, that the replacement timing of the toner bottles BY, BM, BC, and BK is approaching. The used toner bottle BY is removed from the bottle housing hole H as in FIG. 3B, and then a new toner bottle BY is inserted into the bottle housing hole H as in FIG. 3C.

Figure 4A:
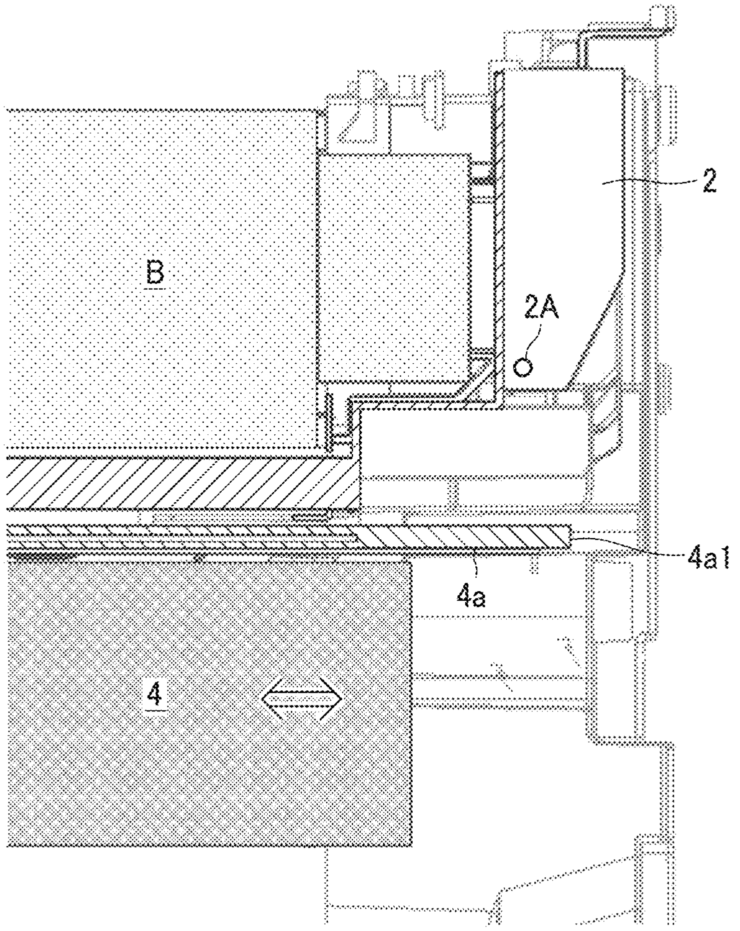
FIG. 4A is a cross-sectional view of the image forming apparatus when a guide rail of an intermediate transfer unit is extended to an intermediate extent, according to an embodiment of the present disclosure.

On the other hand, in a state where the front cover 1*c* is open as in FIG. 2, a lever 4*c* on the front face of the intermediate transfer unit 4 is turned to release the lock for maintenance of the intermediate transfer unit 4. Thus, the intermediate transfer unit 4 can be removed in the right direction indicated by a double-sided arrow in FIG. 4A. When the intermediate transfer unit 4 is attached to the apparatus body 1*a* again after the intermediate transfer unit 4 is removed, as in FIG. 4B, a guided portion 4*b* of the intermediate transfer unit 4 is engaged with the leading end of the horizontal guide rail 4*a*, that is, a body front-side end 4*a*1. After the engagement of the guided portion 4*b*, the intermediate transfer unit 4 can be slidably guided to the far side (left side in FIG. 4A) of the apparatus body 1*a* of the image forming apparatus 1 along the guide rail 4*a*.

Figure 4B:
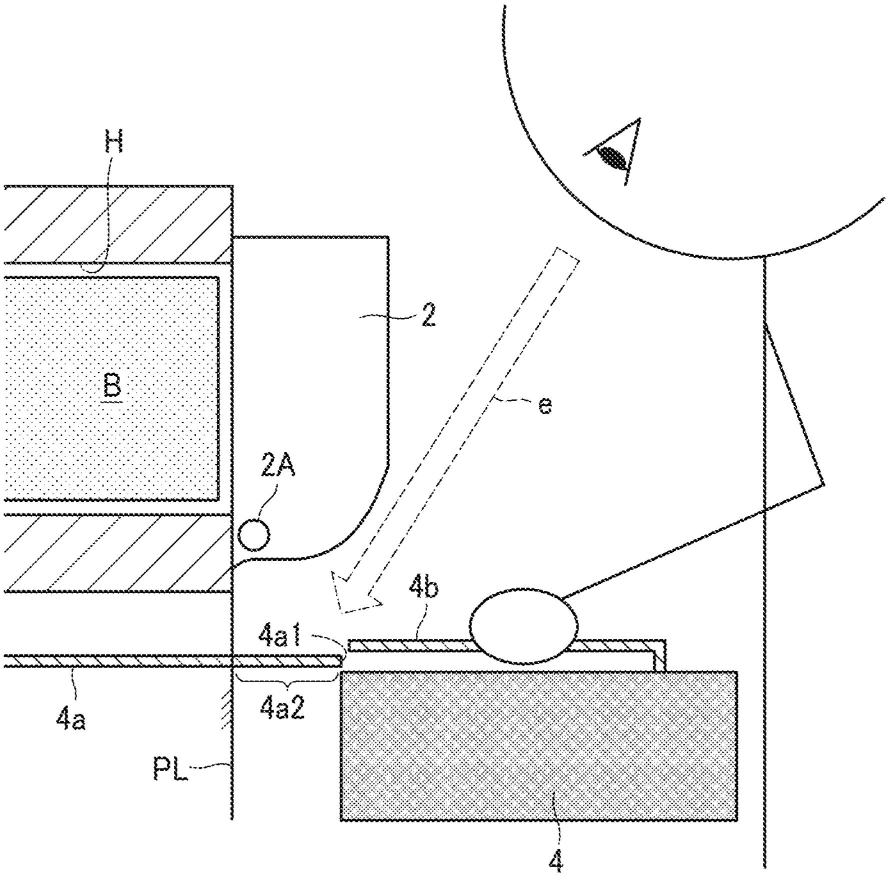
FIG. 4B is another cross-sectional view of the image forming apparatus when a guide rail of an intermediate transfer unit is extended to an intermediate extent and the intermediate transfer unit is attached to the body of the image forming apparatus, according to an embodiment of the present disclosure.
Figure 7:
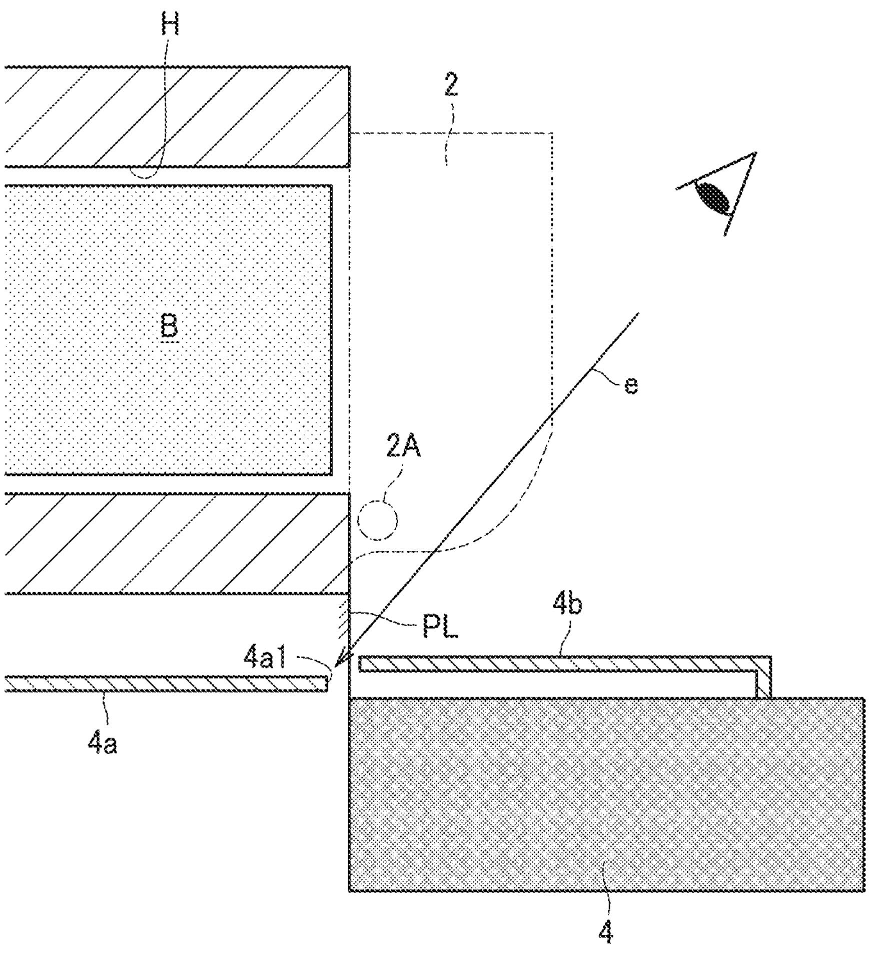
FIG. 7 is a cross-sectional view of a guide rail of an intermediate transfer unit according to a comparative example.

In the present embodiment, the body front-side end 4*a*1 of the guide rail 4*a* extends toward the near side (the body front side) longer than in the comparative example of FIG. 7 by the length of an extended portion 4*a*2 as illustrated in FIG. 4B. In the case of FIG. 7, the body front-side end 4*a*1 of the guide rail 4*a* has not yet reached a vertical projection line PL of the inner face of the cover 2.

The guide rail 4*a* extends toward the near side by the length of the extended portion 4*a*2, so that the user's sight line e reaches the body front-side end 4*a*1 of the extended portion 4*a*2 without being interrupted by the cover 2. Accordingly, the guided portion 4*b* of the intermediate transfer unit 4 is likely to be engaged with the body front-side end 4*a*1 of the guide rail 4*a*.

Figure 5A:
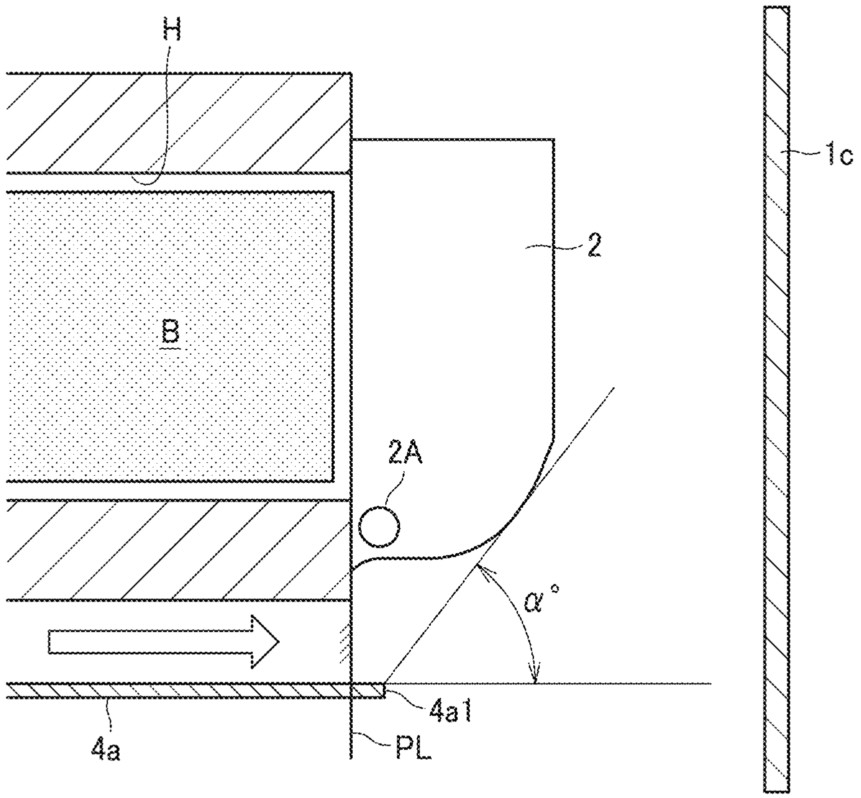
FIG. 5A is a cross-sectional view of the image forming apparatus when a guide rail of an intermediate transfer unit is extended to a small extent, according to an embodiment of the present disclosure.

Even if the guide rail 4*a* is extended beyond the comparative example of FIG. 7 as illustrated in FIG. 5A, an angle α of the user's sight line e looking at the body front-side end 4*a*1 of the guide rail 4*a* turns to be smaller in a case where the extended length is substantially short. The angle α is an angle formed by a tangential line extending from the body front-side end 4*a*1 of the guide rail 4*a* to the lower end of the cover 2 and a horizontal line.

Figure 5B:
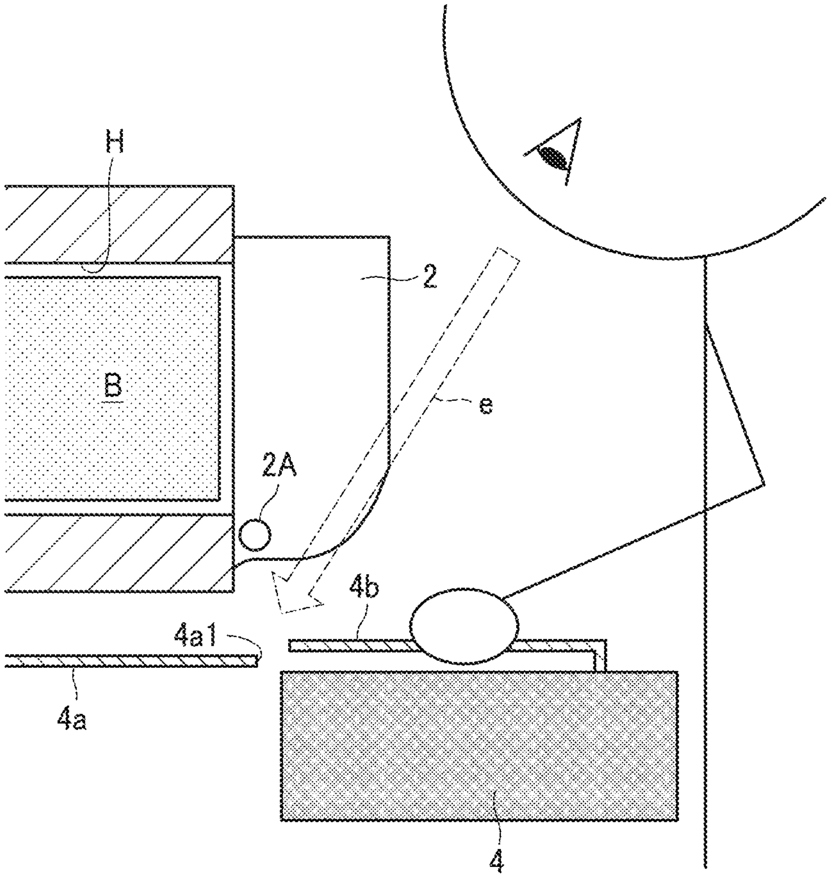
FIG. 5B is another cross-sectional view of the image forming apparatus when the guide rail of the intermediate transfer unit is extended to a small extent and the intermediate transfer unit is attached to the body of the image forming apparatus, according to an embodiment of the present disclosure.

In the case of FIG. 5A, the body front-side end 4*a*1 of the guide rail 4*a* exceeds the vertical projection line PL of the inner face of the cover 2, but is located at substantially the same position as the position of the support shaft 2A of the cover 2. Accordingly, in a state where a user naturally stands in front of the apparatus body, the cover 2 may interfere with the sight line e as in FIG. 5B, and then the user may find it difficult to view directly the body front-side end 4*a*1 of the guide rail 4*a*.

In order to directly view the body front-side end 4*a*1, the user needs to bend down to lower the height of the sight line e. Accordingly, it is difficult to engage the guided portion 4*b* of the intermediate transfer unit 4 with the body front-side end 4*a*1 of the guide rail 4*a*, and then the attachment operation of the intermediate transfer unit 4 does not proceed smoothly.

For this reason, the body front-side end 4*a*1 of the guide rail 4*a* preferably extends outside the apparatus body (toward the near side) beyond the support shaft 2A of the cover 2. If the body front-side end 4*a*1 of the guide rail 4*a* extends outside the apparatus body (toward the near side) beyond the support shaft 2A of the cover 2, the angle α in FIG. 5A is within a range of about 50° to 90°. Within this range, a user can directly view the body front-side end 4*a*1 without being forced to bend down.

Figure 6:
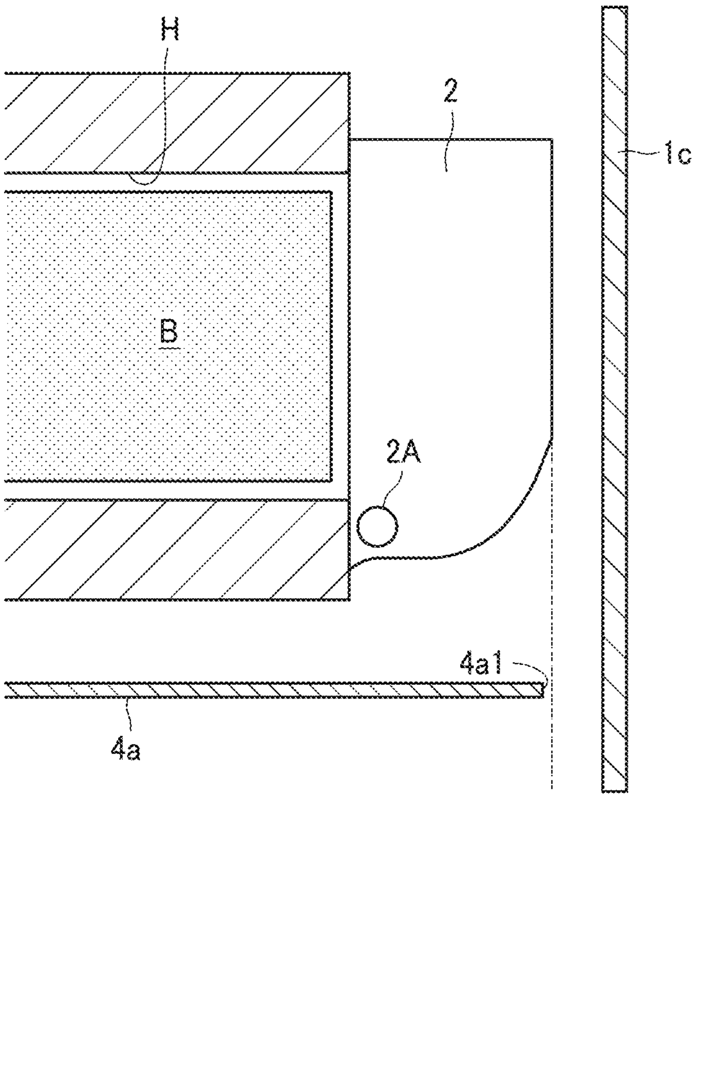
FIG. 6 is a cross-sectional view of an image forming apparatus when a guide rail of an intermediate transfer unit is extended to a maximum extent, according to an embodiment of the present disclosure.

On the other hand, as illustrated in FIG. 6, the maximum length when the body front-side end 4*a*1 of the guide rail 4*a* extends is preferably positioned adjacent to the inner face of the front cover 1*c*. At the position of the body front-side end 4*a*1 in FIG. 6, the body front-side end 4*a*1 and the front cover 1*c* do not interfere with each other. Thus, there is no trouble at all in opening and closing the front cover 1*c*, and the apparatus body does not have to be large.

Note that numerous additional modifications and variations are possible in light of the above teachings. It is therefore to be understood that within the scope of the appended claims, the embodiments of the present disclosure may be practiced otherwise than as specifically described herein. For example, elements and/or features of different illustrative embodiments may be combined with each other and/or substituted for each other within the scope of this disclosure and appended claims. For example, in the present embodiment, a four-tandem-type intermediate-transfer color printer 1 is exemplified as an image forming apparatus, but the image forming apparatus is not limited to a color printer. The image forming apparatus may be, for example, an intermediate-transfer-type monochrome printer.

Preferable aspects of the present disclosure are described below.

First Aspect

In the first aspect, an image forming apparatus (e.g., the image forming apparatus 1) includes: an image forming device (e.g., the image forming device 1*b*) having a photoconductor (e.g., the photoconductor 30); a bottle housing hole (e.g., the bottle housing hole H) in which a toner bottle (e.g., the toner bottle BY, BM, BC, BK) that is disposed above the image forming device to supply developer to the photoconductor is removably inserted; and an intermediate transfer unit (e.g., the intermediate transfer unit 4) that includes an intermediate transfer belt (e.g., the transfer belt 45) to contact the photoconductor and a plurality of rollers (e.g., the rollers 41, 42, 43, and 44), on which the intermediate transfer belt is stretched, to drive the plurality of rollers to circulate. The intermediate transfer unit is removably disposed between the image forming device and the bottle housing hole. The toner bottle and the intermediate transfer unit are accessible from a front side of a body of the image forming apparatus. An openable and closable cover (e.g., the cover 2) is disposed at an inlet-and-outlet port of the bottle housing hole. A guide rail (e.g., the guide rail 4*a*) is disposed at a lower side of the bottle housing hole to slidably guide attachment and detachment of the intermediate transfer unit. A body front-side end (e.g., the body front-side end 4*a*1) of the guide rail is extended to a position crossing at least a vertical projection line (e.g., the projection line PL) of the cover.

Second Aspect

In the second aspect, the image forming apparatus (e.g., the image forming apparatus 1) according to the first aspect includes a support shaft (e.g., the support shaft 2A) that supports the cover (e.g., the cover 2) in an openable and closable manner. The support shaft is disposed at a lower end of the cover. The body front-side end (e.g., the body front-side end 4*a*1) of the guide rail (e.g., the guide rail 4*a*) is extended to a position crossing at least a vertical projection line (e.g., the projection line PL) of the support shaft.

Third Aspect

In the third aspect, the image forming apparatus (e.g., the image forming apparatus 1) according to the first or second aspect includes a front cover (e.g., the front cover 1*c*) that is openable and closable and disposed on the front side of the body of the image forming apparatus. The body front-side end (e.g., the body front-side end 4a1) of the guide rail (e.g., the guide rail 4a) is extended to a position adjacent to an inner face of the front cover.

Fourth Aspect

In the fourth aspect, in the image forming apparatus (e.g., the image forming apparatus 1) according to any one of the first to third aspects, an angle (e.g., the angle α) formed by a tangential line extending from the body front-side end (e.g., the body front-side end 4a1) of the guide rail (e.g., the guide rail 4a) to a lower end of the cover (e.g., the cover 2) and a horizontal line is within a range of 50° to 90°.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. An image forming apparatus comprising:

an image forming device having a photoconductor;

a body having a bottle housing hole in which a toner bottle is removably inserted, the toner bottle disposed above the image forming device to supply developer to the photoconductor;

an intermediate transfer unit including:

an intermediate transfer belt to contact the photoconductor; and a plurality of rollers, on which the intermediate transfer belt is stretched, to drive the intermediate transfer belt to circulate, the intermediate transfer unit removably disposed between the image forming device and the bottle housing hole, the intermediate transfer unit and the toner bottle accessible from a front side of the body of the image forming apparatus;

a cover that is openable and closable and disposed at an inlet-and-outlet port of the bottle housing hole; and a guide rail disposed at a lower side of the bottle housing hole to slidably guide attachment and detachment of the intermediate transfer unit, the guide rail having a front-side end on the front side of the body, the front-side end extended to a position crossing at least a vertical projection line of the cover.

2. The image forming apparatus according to claim 1, further comprising a support shaft disposed at a lower end of the cover to support the cover in an openable and closable manner, wherein the front-side end of the guide rail is extended to a position crossing at least a vertical projection line of the support shaft.

3. The image forming apparatus according to claim 1, further comprising a front cover that is openable and closable and disposed on the front side of the body of the image forming apparatus, wherein the front-side end of the guide rail is extended to a position adjacent to an inner face of the front cover.

4. The image forming apparatus according to claim 1, wherein an angle formed by a tangential line extending from the front-side end of the guide rail to a lower end of the cover and a horizontal line is within a range of 50° to 90°.

* * * * *